US010767064B2

(12) United States Patent
Loccufier et al.

(10) Patent No.: US 10,767,064 B2
(45) Date of Patent: Sep. 8, 2020

(54) INK JET INKS HAVING IR-ABSORBING DYE

(71) Applicant: AGFA NV, Mortsel (BE)

(72) Inventors: Johan Loccufier, Mortsel (BE); Ellen Bertels, Mortsel (BE)

(73) Assignee: AGFA NV, Morstel (BE)

(*) Notice: Subject to any disclaimer, the term of this patent is extended or adjusted under 35 U.S.C. 154(b) by 0 days.

(21) Appl. No.: 16/343,804

(22) PCT Filed: Oct. 12, 2017

(86) PCT No.: PCT/EP2017/076054

§ 371 (c)(1),
(2) Date: Apr. 22, 2019

(87) PCT Pub. No.: WO2018/077626

PCT Pub. Date: May 3, 2018

(65) Prior Publication Data

US 2019/0264052 A1 Aug. 29, 2019

(30) Foreign Application Priority Data

Oct. 28, 2016 (EP) .................................... 16196265

(51) Int. Cl.

| | |
|---|---|
| ***B41J 2/01*** | (2006.01) |
| ***B41J 11/00*** | (2006.01) |
| ***C09D 11/328*** | (2014.01) |
| ***B41M 5/00*** | (2006.01) |
| ***C09B 23/08*** | (2006.01) |
| ***C09D 11/033*** | (2014.01) |
| ***C09D 11/037*** | (2014.01) |
| ***C09D 11/102*** | (2014.01) |
| ***C09D 11/322*** | (2014.01) |
| ***C09B 67/22*** | (2006.01) |

(52) U.S. Cl.

CPC ............... *C09D 11/328* (2013.01); *B41J 2/01* (2013.01); *B41J 11/002* (2013.01); *B41M 5/0023* (2013.01); *C09B 23/086* (2013.01); *C09B 67/0033* (2013.01); *C09D 11/033* (2013.01); *C09D 11/037* (2013.01); *C09D 11/102* (2013.01); *C09D 11/322* (2013.01)

(58) Field of Classification Search

CPC ........ B41J 2/01; B41J 11/002; B41M 5/0023; C09B 23/086; C09B 67/0033; C09B 67/22; C09D 11/033; C09D 11/037; C09D 11/102; C09D 11/322; C09D 11/328; C09D 23/0008; C09D 23/086; C09D 413/14; C09D 17/14; C07D 401/14

See application file for complete search history.

(56) References Cited

U.S. PATENT DOCUMENTS

| | | | | |
|---|---|---|---|---|
| 4,106,027 | A | 8/1978 | Hoffmann et al. | |
| 4,847,385 | A * | 7/1989 | Kusakata ............. | G11B 7/2472 548/455 |
| 5,973,158 | A | 10/1999 | Usami et al. | |
| 9,631,096 | B2 * | 4/2017 | Blanchard ............... | C09B 23/06 |
| 2005/0238994 | A1 | 10/2005 | Vermeersch et al. | |
| 2006/0189803 | A1 * | 8/2006 | Shinpo ................ | C09B 23/0016 544/64 |
| 2013/0087741 | A1 * | 4/2013 | Widzinski ............. | C09D 11/50 252/301.35 |
| 2013/0089713 | A1 | 4/2013 | Widzinski et al. | |

FOREIGN PATENT DOCUMENTS

| | | | |
|---|---|---|---|
| DE | 10 2015 217 597 | A1 | 4/2016 |
| EP | 0 147 257 | A1 | 7/1985 |
| WO | 2010/151264 | A1 | 12/2010 |
| WO | 2011/014196 | A1 | 2/2011 |

OTHER PUBLICATIONS

Official Communication issued in International Patent Application No. PCT/EP2017/076054, dated Dec. 13, 2017.

* cited by examiner

*Primary Examiner* — Anh T Vo
(74) *Attorney, Agent, or Firm* — Stinson LLP

(57) ABSTRACT

An ink jet ink includes water, a water-soluble organic solvent, a resin, and an anionic heptamethine cyanine dye including a substituted or unsubstituted five or six membered ring in the heptamethine chain, the dye having a maximum absorption between 800 and 1200 nm to increase drying speed and improve image quality when dried with NIR or CIR dryers.

20 Claims, No Drawings

INK JET INKS HAVING IR-ABSORBING DYE

CROSS REFERENCE TO RELATED APPLICATIONS

This application is a 371 National Stage Application of PCT/EP2017/076054, filed Oct. 12, 2017. This application claims the benefit of European Application No. 16196265.9, filed Oct. 28, 2016, which is incorporated by reference herein in its entirety.

BACKGROUND OF THE INVENTION

1. Field of the Invention

The present invention relates to aqueous ink compositions for inkjet recording.

2. Description of the Related Art

Inkjet recording has rapidly prevailed and is now still expanding its applications with various advantages such as economical consumables, high recording speed, low recording noise and an ease of full-colour recording. Inkjet recording processes include ejecting ink droplets by applying pressure with piezoelectric elements, ejecting ink droplets by generating bubbles in the ink by heat, ejecting based on ultra-sonic wave and ejecting ink droplets with electrostatic force. For all these inkjet recording processes, inkjet inks have been developed.

Inks, such as solvent-based inkjet inks using an organic solvent as a vehicle, and ultraviolet curable inkjet inks including a polymerisable monomer as a main component have been used widely in industrial applications.

Solvent-based inkjet inks are not environmentally preferable because the solvent is evaporated in the atmosphere, and ultraviolet curable inkjet inks have limited application fields because they may have skin sensitizing properties depending on the monomer to be used and an expensive ultraviolet irradiation apparatus is required to be incorporated to the main body of a printer.

Aqueous inks for inkjet recording have the advantage to give less environmental load, due to less solvent evaporation during printing. These inks are characterized by the presence of a resin which binds the pigments and prevents rubbing off the images from the substrate without the need for ultraviolet curing monomers.

Aqueous inkjet inks contain water as the principal solvent and this water has to be evaporated by means of an additional drying step after the deposition of the inkjet ink onto a substrate. Due to productivity requests, the speed of inkjet printing is more and more increasing. Hence the speed of drying has also to be increased. A fast drying is even more crucial when the substrate is non-porous because the substrate can not absorb the aqueous ink and evacuate the ink drops from the substrate surface.

Insufficient drying speed leads to transfer of inks to the back of the substrate when stacking printed images or in a roll-to-roll printing process. Other disadvantages of an insufficient drying speed of the inkjet ink are the decrease in quality of colour reproduction due to the coalescence of ink droplets.

In order to increase the drying speed during inkjet printing, equipment manufacturers have incorporated radiation heaters such as NIR-dryers (Near Infra Red) and CIR-dryers (Carbon Infra Red) in the drying section of the printer. These heaters lead to a much faster drying than convection based heaters.

DE102015217597A discloses the use of J-aggregating dyes wherein the formed J-aggregate absorbs IR radiation and does not stain the ink. The extent to which dyes, more particularly cyanine dyes, have a tendency to form J-aggregates is dependent on the chemical environment making their spectral absorption dependent on the ink composition. Therefore the response of the ink to NIR or CIR drying is expected to be dependent on the formulation when J-aggregating infrared dyes are used to enhance the drying rate. Furthermore, dyes which have a tendency to form J-aggregates can on prolonged standing give rise to the formation of crystals. The formation of these crystals will severely decrease the shelf life of the ink jet ink and give rise to a poor jetting reliability in the ink jet printing head due to clogging of nozzles.

WO2011/014196 discloses inks comprising NIR absorbing pigments for achieving NIR-based detection purposes in e.g. the printing equipment. Pigments are particles which require dispersants to prevent coagulation and sedimentation of the pigment in the ink and hence to achieve colloidal stability. Dispersants are in most cases polymers. Polymers in the ink composition can interact with other pigments present in the ink, e.g. to obtain a specific ink colour. Polymers interacting with the color pigment may lead to coagulation or flocculation and can hence negatively adverse the colloidal stability of the ink. These polymers in the ink generally increase the viscosity of the ink which may have a negative impact on the jetting reliability of the ink in an inkjet printing head.

WO2010/151264A discloses ink jet inks comprising high $T_g$ polymers and NIR absorbing dyes. The NIR absorbing dyes generate enough heat to uniformly melt the high $T_g$ polymer enhancing the durability of the print. The NIR absorbing dyes disclosed are all phthalocyanines. Most phthalocyanines have a light absorption below 900 nm which is outside the range of the radiation spectra of CIR drying apparatus which has its maximum between 2 and 3 μm.

EP0147257A discloses solvent ink compositions comprising an infrared absorbing oxoindolizinium dye. The ink is used to print bar codes and these are to be detected by equipment which is suitable to read infrared prints.

No documents disclose a solution to enhance the drying speed of aqueous based inkjet inks for dryers based on NIR heaters and CIR heaters where the IR-absorbing component is independent of the composition of the ink and does not negatively adverse the colloidal stability and viscosity of the inkjet ink.

SUMMARY OF THE INVENTION

Preferred embodiments of the present invention provide a solution to the above stated problem. The preferred embodiments have been achieved by incorporating IR-absorbing dyes as defined below into aqueous ink jet inks.

According to another aspect, the present invention includes a method of printing images with an aqueous ink jet ink as defined below. This method is also defined below.

Other features, elements, steps, characteristics and advantages of the present invention will become more apparent from the following detailed description of preferred embodiments of the present invention. Specific embodiments of the invention are also defined in the dependent claims.

DETAILED DESCRIPTION OF THE PREFERRED EMBODIMENTS

A. Ink Composition

A.1. Infrared Absorbing Dye

The aqueous based inkjet ink according to the present invention comprises an anionic heptamethine cyanine dye comprising a substituted or unsubstituted five or six ring in the heptamethine chain and having a structural moiety according to general formula I or general formula II; the dye having a maximum absorption between 800 and 1200 nm increase the drying rate of aqueous ink jet inks when exposed to NIR or CIR dryers, without having a tendency to form J-aggregates in the ink.

General Formula I

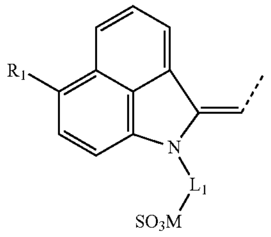

General Formula II

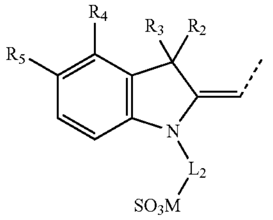

wherein $L_1$ an $L_2$ independently represent a substituted or unsubstituted alkylene group $R_1$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, a halogen, a hydroxyl, an alkoxy group, a thioether, a sulfoxide, a sulfone, a sulfonic acid or salt thereof, a carboxylic acid or salt thereof, an ester, an amide and an amine.

M represents a hydrogen or a counterion to compensate the negative charge of the sulfonate group $R_2$ and $R_3$ are independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group;

$R_2$ and $R_3$ may represent the necessary atoms to form a substituted or unsubstituted five to eight membered ring.

$R_4$ and $R_5$ are independently selected from the group consisting of a hydrogen, a substituted or unsubstituted alkyl group, a substituted or unsubstituted alkenyl group, a substituted or unsubstituted alkenyl group, a substituted or unsubstituted aralkyl group, a substituted or unsubstituted alkaryl group, a substituted or unsubstituted aryl or heteroaryl group, a halogen, a hydroxyl, an alkoxy group, a thioether, a sulfoxide, a sulfone, a sulfonic acid or salt thereof, a carboxylic acid or salt thereof, an ester, an amide and an amine.

$R_4$ and $R_5$ may represent the necessary atoms to form a substituted or unsubstituted five to eight membered ring.

A non J-aggregating infrared dye is defined as a dye meeting the following criteria. The spectral shift between the monomer dye, measured in methanol and the spectrum of the infrared dye in the ink, measured according to Method 1, is 20 nm or less and the shift in the half peak width, determined at half of the maximum absorption in each of the spectra measured to determine the spectral shift is 20 nm or less, showing that the measured spectral shifts are the results of solvatochromic shifts well know in the art and are not caused by J-aggregation.

The monomer spectrum is measured by making a 2 w % solution of the infrared dye in methanol which is diluted 5000 times in methanol. If the solubility of the dye is less then 2 w %, the dilution factor is adjusted to come to the same end concentration.

Method 1: the ink under consideration is measured undiluted using a 0.01 mm precision cell made of Quartz SUPRASIL™, supplied by Hellma.

Non J-aggregating infrared dyes allow designing aqueous ink jet inks responding to NIR and CIR drying independently from their composition, creating formulation latitude to adjust the ink composition in function of the application requirements.

In a preferred embodiment $L_1$ and $L_2$ represent a $C_2$ to $C_4$ alkylene group. In a further preferred embodiment $R_1$ is selected from the group consisting of hydrogen, a halogen and an alkoxy group. In an even further preferred embodiment, $R_2$ and $R_3$ represent a lower alkyl group, a methyl group being particularly preferred. In a further preferred embodiment, $R_4$ and $R_5$ represent the necessary atoms to form a substituted or unsubstituted six membered aromatic ring.

In an even further preferred embodiment, said cyanine dye according to the present invention has a structure according to general formula III.

Formula III

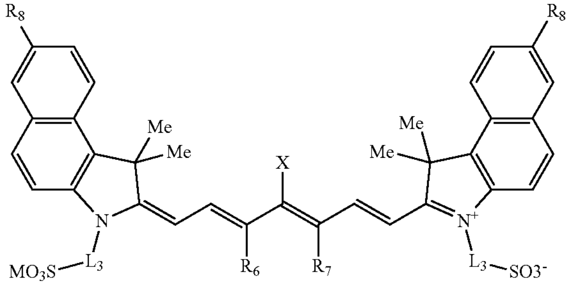

wherein $R_6$ and $R_7$ represent the necessary atoms to form a five or six membered ring $R_8$ is selected from the group consisting of a hydrogen, a halogen, a thioether and an alkoxy group $L_3$ represents a substituted or unsubstituted alkylene group X is selected from the group consisting of a halogen, an amide, a carbamate, a sulphonamide, an alkoxy group, a thioether and a sulfone.

In a further preferred embodiment $R_6$ and $R_7$ represent a substituted or unsubstituted carbocyclic five or six membered ring, an unsubstituted five or six membered carbocyclic ring being particularly preferred. In a further preferred embodiment, X is selected from the group consisting of a halogen, a sulfone and a thioether, a halogen being particularly preferred.

In another preferred embodiment, said cyanine dye according to the present invention has a structure according to general formula IV.

General formula IV

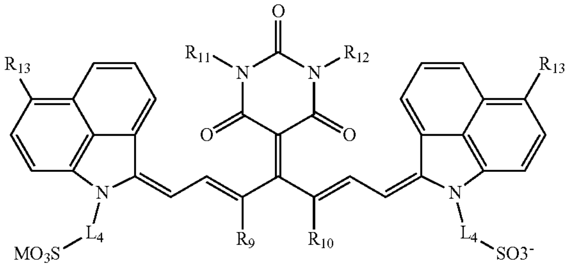

wherein $R_9$ and $R_{10}$ represent the necessary atoms to form a five or six membered ring $R_{11}$ and $R_{12}$ are independently selected from the group consisting of a substituted or unsubstituted alkyl group, a substituted or unsubstituted alkenyl group, a substituted or unsubstituted alkenyl group, a substituted or unsubstituted aralkyl group, a substituted or unsubstituted alkaryl group and a substituted or unsubstituted aryl or heteroaryl group $R_{13}$ is selected from the group consisting of a hydrogen, a halogen and an alkoxygroup $L_4$ represents a substituted or unsubstituted alkylene group.

In a further preferred embodiment, $R_9$ and $R_{10}$ represent a substituted or unsubstituted five or six membered carbocyclic ring, an unsubstituted carbocyclic five or six membered ring being particularly preferred. In an even further preferred embodiment, $R_{13}$ represents hydrogen or an alkoxy group, hydrogen being particularly preferred.

The concentration of the anionic heptamethine cyanine dyes in the ink composition according to the invention is preferably between 0.1 (wt.) % and 2.0 (wt.) %, more preferably between 0.1 (wt.) % and 1.0 (wt.) %, most preferably between 0.5 (wt.) % and 1.0 (wt.) %.

Specific examples of preferred cyanine dyes according to the present invention are given below without being limited thereto.

TABLE 4

IR-1

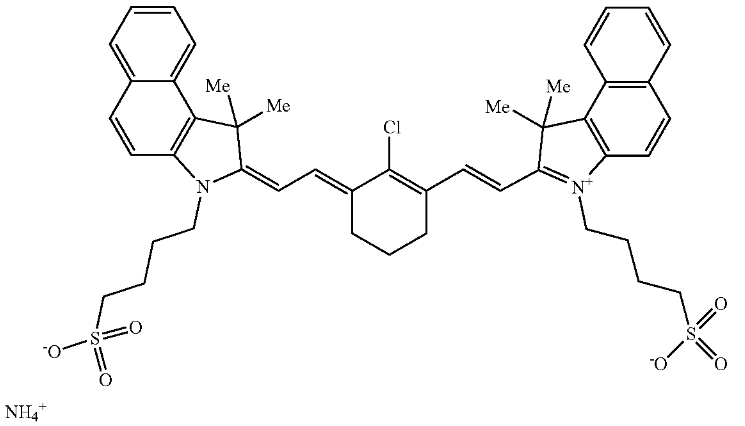

IR-2

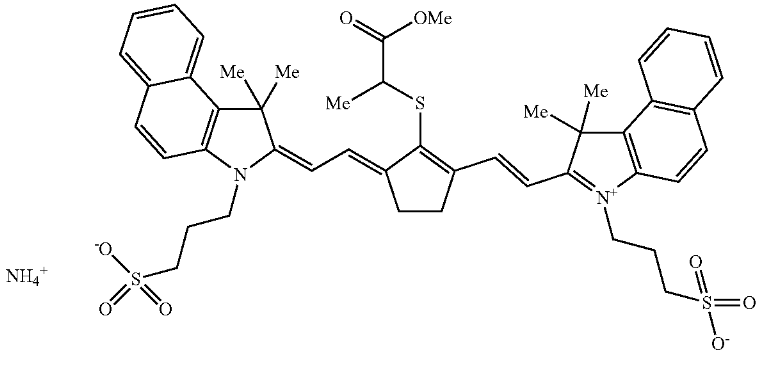

TABLE 4-continued
IR-3
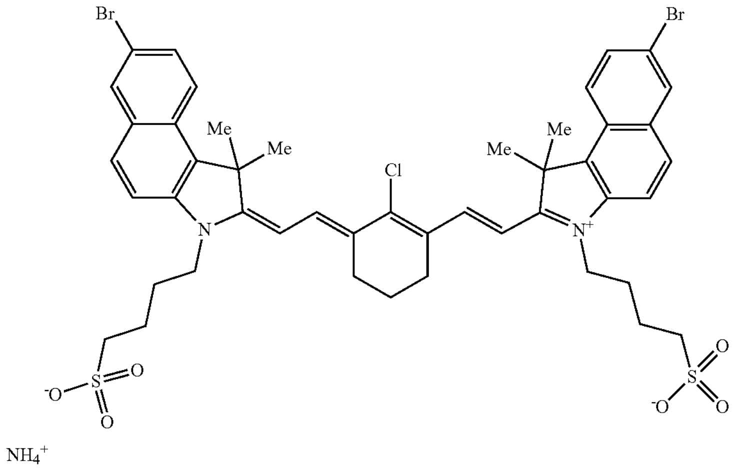
IR-4
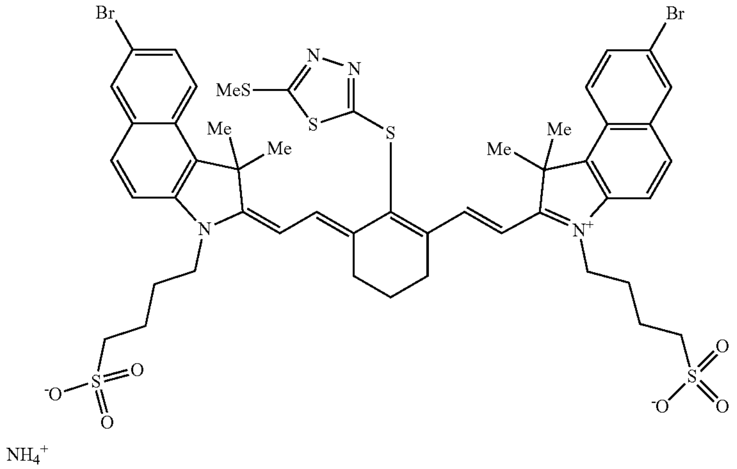
IR-5
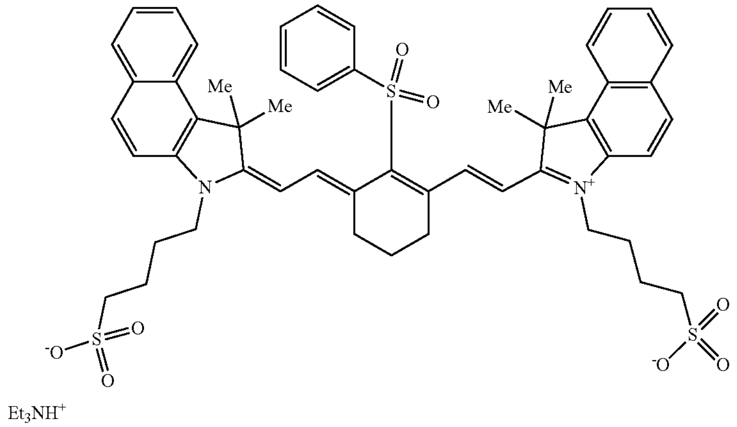

TABLE 4-continued
IR-6
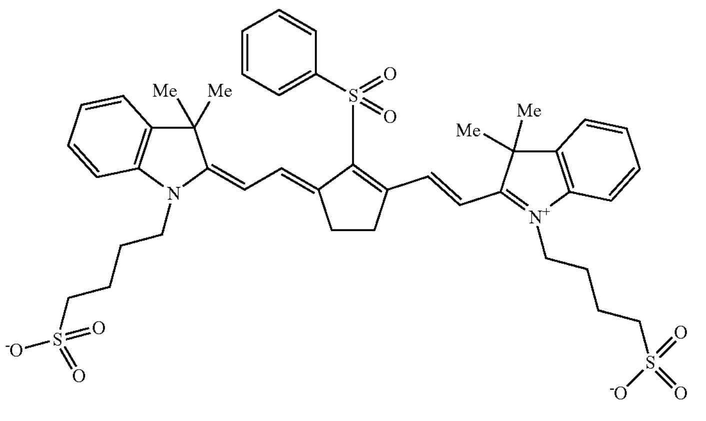
Na+
IR-7
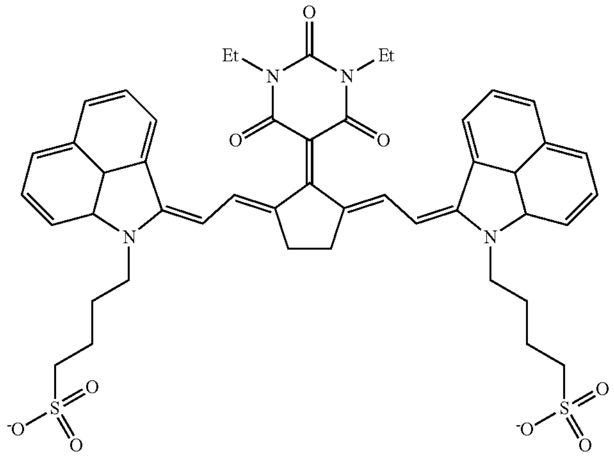
2 $Et_3NH^+$
IR-8
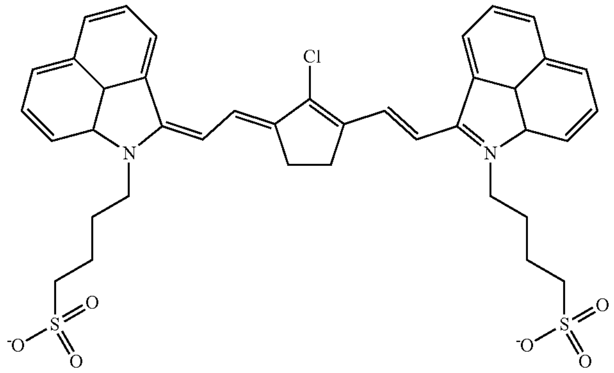
$NH_4^+$ TABLE 4-continued

IR-9

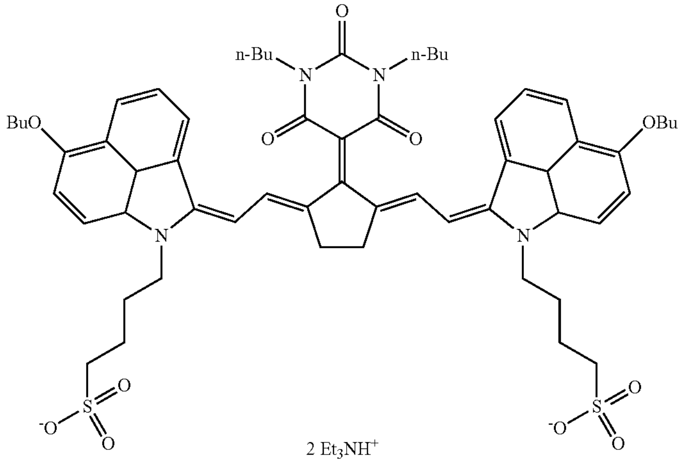

IR-10

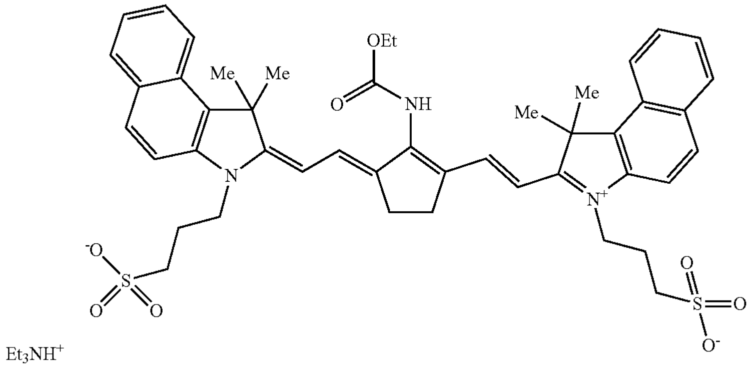

IR-11

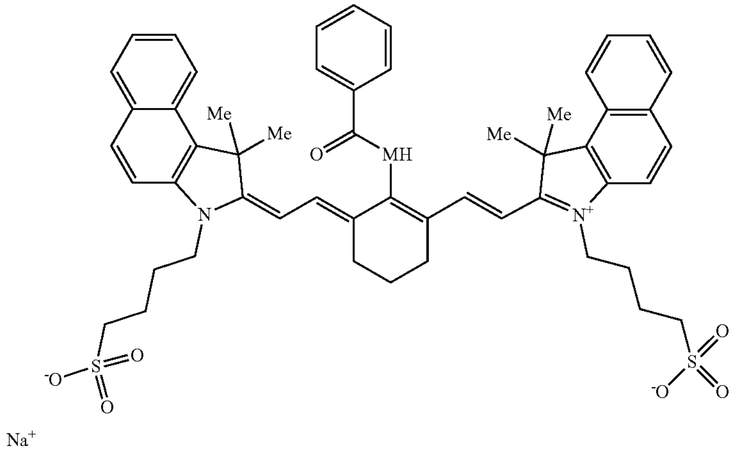

Typical synthetic methods for the preparation of cyanine dyes according to the present invention are disclosed in WO2010031758 (Agfa Graphics N.V.), EP2463096 (Agfa Gevaert N.V.), EP2072570 (Agfa Gevaert N.V.), EP2940082 (Agfa Gevaert N.V.), DE4331162 (Bayer A.G.) and by Narayanan and Patonay (J. Org. Chem., 60(8), 2391-2395 (1995)).

A.2. Resin

The ink jet ink composition according to the invention comprises a resin. The resin is a polymer and suitable resins can be acrylic based resins, urethane-modified polyester resin or a polyethylene wax suspension.

The polyurethane resin is to be incorporated in the ink formulation as a dispersion and may be selected from the group consisting of aliphatic polyurethane dispersions, aromatic polyurethane dispersions, anionic polyurethane dispersions, non-ionic polyurethane dispersions, aliphatic polyester polyurethane dispersions, aliphatic polycarbonate polyurethane dispersions, aliphatic acrylic modified polyurethane dispersions, aromatic polyester polyurethane dispersions, aromatic polycarbonate polyurethane dispersions, aromatic acrylic modified polyurethane dispersions, for example, or a combination of two or more of the above.

A preferred urethane resin to be used as dispersion in the ink of the invention is a polyester resin including a structural unit containing a urethane bond. Among such resins, a water-soluble or water-dispersible urethane-modified polyester resin is preferred. It is preferable that the urethane-modified polyester resin include at least one structural unit derived from a hydroxyl group-containing polyester resin (polyester polyol) and at least one structural unit derived from an organic polyisocyanate.

Furthermore, the hydroxyl group-containing polyester resin is a resin formed by an esterification reaction or transesterification reaction between at least one polybasic acid component and at least one polyhydric alcohol component.

A preferred polyurethane resin to be included in the ink of the invention is a polyurethane resin obtainable by reacting a polyester polyol, a polyether diol, a polyol containing an anionic group and a polyisocyanate. A particular preferred polyurethane resin is a polyurethane resin obtainable by reacting a polyester polyol, a polyether diol, a polyol containing an anionic group and a polyisocyanate, and wherein the polyester polyol is obtained by reacting an aromatic polycarboxylic acid and a polyol. Examples of suitable polyurethane resins and their preparations are disclosed in the unpublished patent application EP16196224.6.

Some examples of suitable polyurethane dispersions are NEOREZ R-989, NEOREZ R-2005, and NEOREZ R-4000 (DSM NeoResins); BAYHYDROL UH 2606, BAYHYDROL UH XP 2719, BAYHYDROL UH XP 2648, and BAYHYDROL UA XP 2631 (Bayer Material Science); DAOTAN VTW 1262/35WA, DAOTAN VTW 1265/36WA, DAOTAN VTW 1267/36WA, DAOTAN VTW 6421/42WA, DAOTAN VTW 6462/36WA (Cytec Engineered Materials Inc., Anaheim Calif.); and SANCURE 2715, SANCURE 20041, SANCURE 2725 (Lubrizol Corporation), for example, or a combination of two or more of the above.

Acrylic based resins include polymers of acrylic monomers, polymers of methacrylic monomers, and copolymers of the aforementioned monomers with other monomers. These resins are present as a suspension of particles having an average diameter of about 30 nm to about 300 nm. The acrylic latex polymer is formed from acrylic monomers or methacrylic monomer residues. Examples of monomers of the acrylic latex polymer include, by way of illustration, acrylic monomers, such as, for example, acrylate esters, acrylamides, and acrylic acids, and methacrylic monomers, such as, for example, methacrylate esters, methacrylamides, and methacrylic acids. The acrylic latex polymer may be a homopolymer or copolymer of an acrylic monomer and another monomer such as, for example, a vinyl aromatic monomer including, but not limited to, styrene, styrene butadiene, p-chloromethylstyrene, divinyl benzene, vinyl naphthalene and divinylnaphthalene.

Some examples of suitable acrylic latex polymer suspensions are, JONCRYL 537 and JONCRYL 538 (BASF Corporation, Port ArthurTX); CARBOSET GA-2111, CARBOSET CR-728, CARBOSET CR-785, CARBOSET CR-761, CARBOSET CR-763, CARBOSET CR-765, CARBOSET CR-715, and CARBOSET GA-4028 (Lubrizol Corporation, Rancho Santa Margarita Calif.); NEOCRYL A-1110, NEOCRYL A-1131, NEOCRYL A-2091, NEOCRYL A-1127, NEOCRYL XK-96, and NEOCRYL XK-14 (DSM NeoResins, Sluisweg, The Netherlands); and BAYHYDROL AH XP 2754, BAYHYDROL AH XP 2741, BAYHYDROL A 2427, and BAYHYDROL A2651 (Bayer Material Science, Baytown Tex.), for example, or a combination of two or more of the above.

The concentration of the resin in the ink jet ink according to the invention is at least 1 (wt) % and preferably lower than 30 (wt.) %, more preferably lower than 20 (wt.) %.

A.3. Water-Soluble Organic Solvent

The inkjet ink of the invention contains, besides water as a solvent, also a water-soluble organic solvent. Examples of water-soluble organic solvents include polyhydric alcohols such as diethylene glycol, triethylene glycol, dipropylene glycol, 1,3-propanediol, 1,3-butanediol, 1,4-butanediol, 2,2-dimethyl-1, 3-propanediol, 2-methyl-1, 3-propanediol, 1,2-pentanediol, 2,4-pentanediol, 1,5-pentanediol, 1,6-hexanediol, 2-ethyl-1, 3-hexanediol, 1,2-hexanediol and 2,5-hexanediol, polyhydric alcohol alkyl ethers such as dipropylene glycol n-propyl ether, tripropylene glycol methyl ether, tripropylene glycol n-propyl ether, propylene glycol phenyl ether, triethylene glycol methyl ether, triethylene glycol methyl ether, triethylene glycol ethyl ether, diethylene glycol n-hexyl ether and ethylene glycol phenyl ether, and nitrogen-containing heterocyclic compounds such as 2-pyrrolidone and N-methylpyrrolidone.

Other preferred water soluble organic solvents include ethylene glycol, propylene glycol, 1,2-butanediol, 2,3-butanediol, 2-methyl-2, 4-pentanediol, dipropylene glycol monomethyl ether, propylene glycol n-butyl ether, propylene glycol t-butyl ether, diethylene glycol methyl ether, ethylene glycol n-propyl ether and ethylene glycol n-butyl ether.

The content of the water-soluble organic solvent, in the aqueous ink jet ink is preferably 20% by mass or more and less than 70% by mass. If the content is less than 20% by mass, reliable jetting might be difficult, due to for instance a viscosity mismatch between ink and head. If the content exceeds 70% by mass, the ink looses its water based, more green character.

A.4. Colorant

The inkjet ink according to the present invention may contain preferably a colorant. Preferably the colorant is a pigment. As the pigment, any inorganic pigment or organic pigment can be used.

As the inorganic pigment titanium oxide, iron oxide, calcium carbonate, barium sulfate, aluminium hydroxide, Barium Yellow, Cadmium Red, and Chrome Yellow, carbon black can be used. Other suitable inorganic pigments are disclosed in [072-075] from WO2009/053302.

Among them, carbon black (Pigment Black 7) can be preferably used, and examples thereof include carbon blacks available from Cabot Corporation under trademarks Regal, Black Pearls, Elftex, Monarch, Regal, Mogul and Vulcan (for example, Black Pearls 2000, 1400, 1300, 1100, 1000, 900, 880, 800, 700 and 570, Black Pearls L, Elftex 8, Monarch 1400, 1300, 1100, 1000, 900, 880, 800 and 700, Mogul L, Regal 330, 400 and 660, and Vulcan P), and SENSIJET BlackSDP100 (SENSIENT), SENSIJET BlackSDP1000 (SENSIENT) and SENSIJET BlackSDP2000 (SENSIENT).

Examples of the organic pigment include azo pigments (including azo lakes, insoluble azo pigments, condensed azo pigments, and chelate azo pigments), polycyclic pigments (for example, phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (for example, basic dye-type chelates and acidic dye-type chelates), nitro pigments, nitroso pigments, and aniline black. Specific examples include C.I. Pigment Yellow I, 3, 12, 13, 14, 17, 24, 34, 35, 37, 42 (Yellow Iron Oxide), 53, 55, 74, 81, 83, 95, 97, 98, 100, 101, 104, 108, 109, 110, 117, 120, 128, 139, 150, 151, 155, 153, 180, 183, 185 and 213, C.I. Pigment Orange 5, 13, 16, 17, 36, 43 and 51, C.I. Pigment Red I, 2, 3, 5, 17, 22, 23, 31, 38, 48:2, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (Rouge), 104, 105, 106, 108 (Cadmium Red), 112, 114, 122 (Quinacridone Magenta), 123, 146, 149, 166, 168, 170, 172, 177, 178, 179, 185, 190, 193, 209, 219 and 254, C.I. Pigment Violet I (Rhodamine Lake), 3, 5:1, 16, 19, 23 and 38, C.I. Pigment Blue I, 2, 15 (Phthalocyanine Blue), 15:1, 15:2, 15:3 (Phthalocyanine Blue), 16, 17:1, 56, 60 and 63; and C.I. Pigment Green I, 4, 7, 8, 10, 17, 18 and 36.

The method for dispersing the pigment in the ink includes a dispersing method by using a surfactant, a dispersing method by using a dispersible resin, a dispersing method by covering the surface of the pigment with a resin, and a method by introducing a hydrophilic functional group to the surface of the pigment to provide a self-dispersible pigment.

In particular, a self dispersible pigment is preferably used. The self-dispersible pigment having a hydrophilic functional group may also contain an anionic functional group. Examples of the anionic functional group include —COOM, —$SO_3M$, —$PO_3HM$, —$PO_3M_2$, —$SO_2NM_2$, —$C_6H_4$—COOM, —NH—$C_6H_4SO_3M$, —NH—$C_6H_4PO_3HM$, —NH—$C_6H_4PO_3M_2$ and —NH—$C_6H_4$—$SO_2NHM$ and examples of the counter ion M include an alkali metal ion and a quaternary ammonium ion, but a quaternary ammonium ion is preferable. Examples of suitable self dispersible pigments are self-dispersible pigments from Emerald and from Cabot: Cab-O-Jet 200 (K), Cab-O-Jet 250C, Cab-O-Jet 260M & 265 M, Cab-O-Jet 270 Y, are ionically stabilized, Cab-O-Jet 260 (M), Cab-O-Jet 450C, Cab-O-Jet 470Y, Cab-O-Jet 480V, Cab-O-Jet 400 (CB), Cab-O-Jet 465 M, most of them are modified by a sulfonate group.

Examples of the quaternary ammonium ion include a tetramethyl ammonium ion, a tetraethyl ammonium ion, a tetrapropyl ammonium ion, a tetrabutyl ammonium ion, a tetrapentyl ammonium ion, a benzyltrimethyl ammonium ion, a benzyltriethyl ammonium ion, and a tetrahexyl ammonium ion. Among them, a tetraethyl ammonium ion, a tetrabutyl ammonium ion, and benzyltrimethyl ammonium ion are preferable, and a tetrabutyl ammonium ion is particularly preferable.

The self dispersible pigment is preferably a modified pigment which can be modified by a carboxylate or sulfonate group. Other possible groups are a bis-phosphonic acid group or a bis-phosphonic acid salt group, or both thereof.

A.5. Humectant

The ink jet ink of the invention may contain at least one humectant to prevent the clogging of nozzles in an inkjet print head, due to its ability to slow down the evaporation rate of the inkjet ink, especially the water in the inkjet printing liquid. The humectant is an organic solvent having a higher boiling point than water.

Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. A preferred humectant is glycerol or a derivative or isomer of 2-pyrolidone.

The humectant is preferably added to the inkjet printing liquid in an amount of 0.1 to 20 wt % based on the total weight of the inkjet printing liquid.

A.6. Surfactant

In the ink of the present invention, a surfactant may be added in order to ensure wettability onto substrates. The amount of the surfactant added is preferably 0.1 wt. % to 5 wt. % as an active component in the ink.

If the amount added is below 0.1% by mass, wettability onto the substrate is not sufficient and causes degradation in image quality and might cause jetting issues. If the amount exceeds 5% by mass, the ink easily foams to cause non-discharge. The surfactant that can be used is not particularly limited as long as it satisfies the above limitation.

While any of an amphoteric surfactant, a non-ionic surfactant, and an anionic surfactant can be used, non-ionic surfactants such as polyoxyethylene alkyl phenyl ether, polyoxyethylene alkyl ester, polyoxyethylene alkylamine, polyoxyethylene alkyl amide, a polyoxyethylene propylene block polymer, sorbitan fatty acid ester, polyoxyethylene sorbitan fatty acid ester and an ethylene oxide adduct of acetylene alcohol are preferably used in terms of a relationship between dispersing stability of the colour material and image quality. In addition, a fluorine-based surfactant and a silicon-based surfactant can be used in combination (or singly) depending on formulation.

Suitable surfactants are siloxane based surfactants such as Tego Twin 4000 from Evonik Industries, Tegowet 270 from Evonik industries, Hydropalat WE3220 from BASF, silane based surfactants such as Silwet HS312 from Momentive and fluor containing surfactants such as: Thetawet FS8150 from Neochem GMBH, Capstone FS3100 from Dupont, Tivida FL2500 from Merck and surfactants from the Dynol, Envirogem & Surfynol series from Air products.

B. Inkjet Recording Method

The inkjet recording method include at least a step of jetting or printing the ink according to the invention onto a substrate followed by a heating/drying step by means of IR radiation.

The ink jet ink of the present invention is suitable for ink jet printing on different substrates, porous and non-porous ones. Porous substrates include paper, card board, white lined chipboard, corrugated board, packaging board, wood, ceramics, stone, leather and textile. Non-porous substrates include metal, synthetic leather, glass, polypropylene, polyvinylchloride, PET, PMMA, polycarbonate, polyamide, polystyrene or co-polymers thereof. The heating step of the substrate is particularly advantageously when non-porous substrates are used in the inkjet recording method of the invention.

In some instances, a pre-treatment liquid may be applied to the substrate prior to printing the inkjet ink of the invention onto the substrate. Pre-treatment liquids are preferably applied on porous substrates.

The printed or jetted ink must be dried in a heating/drying step. The heating is performed by IR-radiation heaters such as NIR-heating (Near Infra Red) or CIR-heating (Carbon Infra Red) apparatus. NIR-heating apparatus include sources such as lamps and tubes which emit radiation in the range of 700 nm to 1400 nm. CIR heating apparatus include sources such as lamps emitting radiation having a peak wavelength of 2.3 μm. The CIR and NIR radiation heating can be combined with forced-air heating, conduction heating, high-frequency heating and microwave heating. IR-radiation based heating apparatus such as NIR and CIR heaters are commercially available from Heraeus Noblelight, Phoseon, etc. . . . . The heating temperature after printing is preferably high in terms of drying properties to avoid set off during roll up or stacking after printing, but a too high heating temperature is not preferable because the substrate for printing can be damaged and an ink head can also be warmed to a temperature outside its optimal working range.

In a preferred embodiment of the inkjet recording method, the substrate can be heated prior to and/or during to the ink jetting step. The temperature in the step of heating the substrate can be changed depending on the type and amount of the water-soluble organic solvent contained in the ink and the minimum film formation temperature of the resin added, and can be further changed depending on the type of a substrate for printing.

Especially, heating of non-porous substrates results in an improved image quality in combination with high printing speeds. The heating temperature is generally controlled to 80° C. or lower to prevent deformation of the substrate, but is preferably raised in the range of 40° C. to 80° C.

While the ink of the present invention can be used for printing a high-quality image, the substrate is advantageously heated before and/or during jetting of the ink in order to form an image having a higher image quality (e.g. coalescence) a high scratch resistance a high adhesiveness and in order to achieve high printing speeds.

The mode of jetting the ink is not particularly limited and is different depending on the type of the stimulus, and when the stimulus is "heat", examples of the mode include a method in which heat energy corresponding to a recording signal is applied to the ink in a recording head using a thermal head or the like to thereby allow the ink to generate air bubbles, and the pressure of the air bubbles allows the ink to be discharged and jetted as droplets from a nozzle hole of the recording head. In addition, when the stimulus is "pressure", examples of the mode include a method in which a voltage is applied to a piezoelectric element adhered to a position called pressure chamber located in an ink passage in a recording head, to deflect the piezoelectric element and to decrease the volume of the pressure chamber, discharging and jetting the ink as droplets from a nozzle hole of the recording head.

Among them, preferable is the method in which a voltage is applied to a piezo element to allow the ink for recording to be ejected. Since a piezo system does not generate heat, this is efficient for allowing a resin particle-containing ink to be ejected, and is an effective method that causes less nozzle clogging.

Example

1. Materials

All materials used in the following examples were readily available from standard sources such as Sigma-Aldrich (Belgium) and Acros (Belgium) unless otherwise specified. The water used was demineralised water.

IR-DYE-1 is an infrared absorbing dye (CASRN1161923-59-6) having following formula:

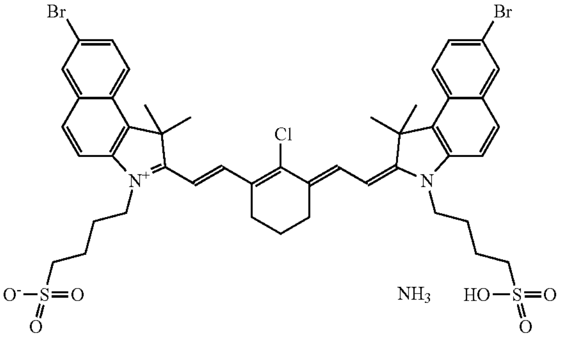

A suitable synthesis method of this type of dyes can be found in WO2002/24815.

IR-DYE-2 is an infrared absorbing dye (CASRN1073607-50-7) having following formula:

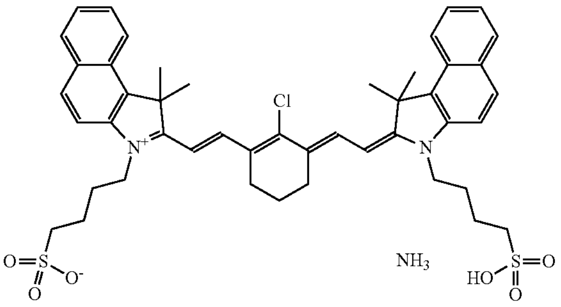

A suitable synthesis method of this type of dyes can be found in WO2002/24815.

PU-1 is an aqueous dispersion of a polyurethane resin obtained according to the same synthesis procedure for PU-1 as described in the unpublished patent application EP16196224.6

COL-1 is a commercial yellow dispersion supplied by DIAMOND DISPERSIONS LTD, available under the trade name Diamond D75Y PYR is 2-pyrrolidone HD is 1,2-hexanediol SURF-1 is Thetawet™ FS8150 a fluoro-based surfactant from NEOCHEM GMBH SUBST is a PVC based substrate of 225 micron thickness also known as MetaMark MD5 from Metamark.

2. Measurement Methods 2.1. Ink Coatings

The ink jet ink formulations were coated with an automated bar coater using a 10 μm spiral bar head on SUBST. The coatings were dried using a NIR dryer from Phoseon. The substrate coated with the ink formulation is then passing under the NIR dryer at a speed of 50 mm/s, the intensity of the NIR-lamp was set to 100% and the distance between the lamp and the substrate is 15 mm.

2.2. Drying Speed

The speed of drying of the ink jet ink was determined by wiping the ink coatings obtained in § 2.1. with a cotton swab before and after the drying. The evaluation was done visually using the criteria as listed in Table 1.

TABLE 1

| Visual evaluation | Score |
|---|---|
| No difference noticeable in marking of the cotton swab prior to drying and after NIR drying | 0 |
| Marking of cotton swab is visible but clearly less pronounced as the marking prior to NIR drying | + |
| No marking visible after NIR drying | ++ |

3. Inkjet Recording Method

This example shows that the incorporation of an IR-absorbing dye reduces the drying time of the ink jet ink.

Preparation of Ink Jet Inks

Yellow ink jet inks were prepared by mixing the compounds given in Table 2. All weight percentages are relative to the total weight of the ink jet ink. The amount of the PU-resin dispersion was chosen in such a way to achieve a content of 12.0 wt. % solid PU-resin.

TABLE 2

| Compound (wt.) % | Y-1 | Y-2 | Y-3 |
|---|---|---|---|
| PU-1 resin | 12.0 | 12.0 | 12.0 |
| COL-1 | 3.0 | 3.0 | 3.0 |
| PYR | 28.0 | 28.0 | 28.0 |
| HD | 10.0 | 10.0 | 10.0 |
| SURF-1 | 0.8 | 0.8 | 0.8 |
| IR-DYE-1 | — | 0.5 | — |
| IR-DYE-2 | — | — | 0.5 |
| Water | Up to 100% | Up to 100% | Up to 100% |

Evaluation and Results

Inks with and without IR absorbing dyes were evaluated for drying speed with an NIR dryer according to § 2.2. The results are summarised in Table 3.

As can be seen from the table, the inks including an IR-absorbing dye show a higher drying speed.

TABLE 3

| Ink jet ink | Drying speed |
|---|---|
| Y-1 | + |
| Y-2 | ++ |
| Y-3 | ++ |

The invention claimed is:

1. An ink jet ink comprising:

water;

a water-soluble organic solvent;

a resin; and an anionic heptamethine cyanine dye including a substituted or unsubstituted five or six membered ring in a chain of the anionic heptamethine cyanine dye, the anionic heptamethine cyanine dye having a maximum absorption between 800 nm and 1200 nm and including a structural moiety according to formula I or formula II:

formula I

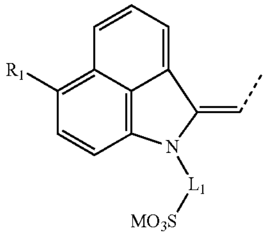

formula II

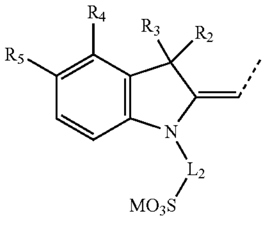

wherein $L_1$ and $L_2$ independently represent a substituted or unsubstituted alkylene group;

$R_1$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, a halogen, a hydroxyl, an alkoxy group, a thioether, a sulfoxide, a sulfone, a sulfonic acid or salt thereof, a carboxylic acid or salt thereof, an ester, an amide, and an amine;

M represents a hydrogen or a counterion that compensates for a negative charge of the sulfonate group $MO_3S$;

$R_2$ and $R_3$ are independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group, and $R_2$ and $R_3$ may represent atoms necessary to form a substituted or unsubstituted five to eight membered ring; and $R_4$ and $R_5$ are independently selected from the group consisting of a hydrogen, a substituted or unsubstituted alkyl group, a substituted or unsubstituted alkenyl group, a substituted or unsubstituted alkenyl group, a substituted or unsubstituted aralkyl group, a substituted or unsubstituted alkaryl group, a substituted or aryl or heteroaryl group, a halogen, a hydroxyl, an alkoxy group, a thioether, a sulfoxide, a sulfone, a sulfonic acid or salt thereof, a carboxylic acid or salt thereof, an ester, an amide, and an amine, and $R_4$ and $R_5$ may represent atoms necessary to form a substituted or unsubstituted five to eight membered ring.

2. The ink jet ink according to claim 1, wherein the anionic heptamethine cyanine dye includes a compound according to formula III:

formula III

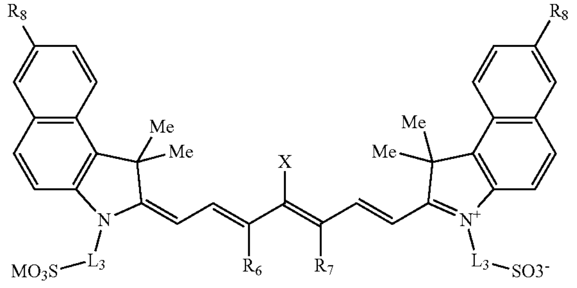

wherein $R_6$ and $R_7$ represent atoms necessary to form a five or six membered ring;

$R_8$ is selected from the group consisting of a hydrogen, a halogen, a thioether, and an alkoxy group;

$L_3$ represents a substituted or unsubstituted alkylene group;

X is selected from the group consisting of a halogen, an amide, a carbamate, a sulphonamide, an alkoxy group, a thioether, and a sulfone; and Me is a methyl group.

3. The ink jet ink according to claim 2, wherein $R_6$ and $R_7$ represent an unsubstituted carbocyclic five or six membered ring, and X represents a halogen.

4. The ink jet ink according to claim 2, further comprising a colorant.

5. The ink jet ink according to claim 4, wherein the colorant is a pigment.

6. The ink jet ink according to claim 1, wherein the anionic heptamethine cyanine dye includes a compound having the formula IV:

formula IV

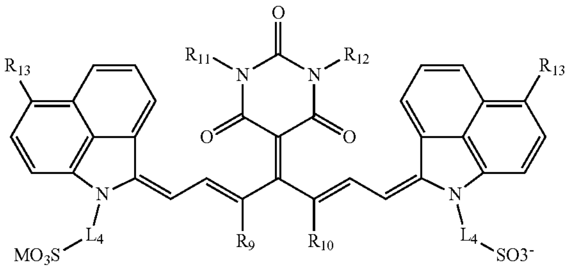

wherein $R_9$ and $R_{10}$ represent atoms necessary to form a five or six membered ring;

$R_{11}$ and $R_{12}$ are independently selected from the group consisting of a substituted or unsubstituted alkyl group, a substituted or unsubstituted alkenyl group, a substituted or unsubstituted alkenyl group, a substituted or unsubstituted aralkyl group, a substituted or unsubstituted alkaryl group, and a substituted or unsubstituted aryl or heteroaryl group;

$R_{13}$ is selected from the group consisting of a hydrogen, a halogen, and an alkoxygroup; and $L_4$ represents a substituted or unsubstituted alkylene group.

7. The ink jet ink according to claim 6, wherein $R_9$ and $R_{10}$ represent an unsubstituted carbocyclic five or six membered ring, and $R_{13}$ represents hydrogen.

8. The ink jet ink according to claim 6, further comprising a colorant.

9. The ink jet ink according to claim 8, wherein the colorant is a pigment.

10. The ink jet ink according to claim 8, wherein the resin includes a polyurethane resin.

11. The ink jet ink according to claim 10, wherein the polyurethane resin is obtained by reacting a polyester polyol, a polyether diol, a polyol including an anionic group, and a polyisocyanate; and the polyester polyol is obtained by reacting an aromatic polycarboxylic acid and a polyol.

12. The ink jet ink according to claim 1, further comprising a colorant.

13. The ink jet ink according to claim 12, wherein the colorant is a pigment.

14. The ink jet ink according to claim 1, wherein the resin includes a polyurethane resin.

15. The ink jet ink according to claim 14, wherein the polyurethane resin is obtained by reacting a polyester polyol, a polyether diol, a polyol including an anionic group, and a polyisocyanate; and the polyester polyol is obtained by reacting an aromatic polycarboxylic acid and a polyol.

16. The ink jet ink according to claim 12, wherein the resin includes a polyurethane resin.

17. A method of ink jet recording comprising:

providing a substrate;

jetting on the substrate the ink jet ink according to claim 1; and heating the ink jetted on the substrate with a Near Infra Red heater or a Carbon Infra Red heater.

18. The method according to claim 17, wherein the ink jet ink includes a colorant.

19. The method according to claim 17, wherein the resin includes a polyurethane resin.

20. The method according to claim 19, wherein the polyurethane resin is obtained by reacting a polyester polyol, a polyether diol, a polyol including an anionic group, and a polyisocyanate; and the polyester polyol is obtained by reacting an aromatic polycarboxylic acid and a polyol.

* * * * *